United States Patent
Markham (10) Patent No.: US 12,369,566 B2
(45) Date of Patent: *Jul. 29, 2025

(54) PET TOY WITH INTERCONNECTING GROOVES AND OPEN CORE

(71) Applicant: Bounce Enterprises LLC, Golden, CO (US)

(72) Inventor: Joseph P. Markham, Golden, CO (US)

(73) Assignee: Bounce Enterprises LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,710

(22) Filed: Jun. 29, 2023

(65) Prior Publication Data

US 2023/0337632 A1 Oct. 26, 2023

Related U.S. Application Data

(63) Continuation-in-part of application No. 18/142,959, filed on May 3, 2023, now Pat. No. 12,075,757, which is a continuation of application No. 17/138,590, filed on Dec. 30, 2020, now Pat. No. 11,678,644.

(51) Int. Cl.
*A01K 15/02* (2006.01)

(52) U.S. Cl.
CPC .................................. *A01K 15/026* (2013.01)

(58) Field of Classification Search
CPC .... A01K 15/026; A01K 15/025; A01K 15/02; A63B 43/002; A63B 43/007
See application file for complete search history.

(56) References Cited

U.S. PATENT DOCUMENTS

| | | |
|---|---|---|
| 3,830,202 A | 8/1974 | Garrison |
| 4,802,444 A | 2/1989 | Markham et al. |
| 5,207,420 A | 5/1993 | Crawford et al. |

(Continued)

FOREIGN PATENT DOCUMENTS

| | | |
|---|---|---|
| CN | 207639420 U | 7/2018 |
| JP | 2020532294 A | 11/2020 |
| WO | 2022/147260 A1 | 7/2022 |

OTHER PUBLICATIONS

Banks, Rachel, "Examination Report Regarding Application No. GB2309096.2", Aug. 10, 2023, p. 4, Published in: GB.

(Continued)

*Primary Examiner* — Trinh T Nguyen
(74) *Attorney, Agent, or Firm* — NOD Law PC (57) ABSTRACT

The pet toy of the invention comprises a spherical shaped body with eight distinct quadrants formed on the exterior surface thereof. Each section is three sided, similar to an equilateral triangle except each corner of the triangular-shaped is curved or rounded. A central opening is formed through the pet toy. Preferably, the pet toy is hollow and the pet toy has a substantially uniform sidewall thickness, thereby creating an open core. Measured parameters of the pet toy are provided to minimize the potential of the toy becoming caught in an animal's throat yet the pet toy is still configured to maximize play potential. The measured parameters include, in various combinations of a weight of the pet toy, a diameter of the pet toy, depths of grooves in the pet toy, widths of the grooves and shapes of the grooves.

14 Claims, 5 Drawing Sheets

(56) References Cited

U.S. PATENT DOCUMENTS

| | | | |
|---|---|---|---|
| 5,865,146 | A | 2/1999 | Markham |
| 5,947,061 | A | 9/1999 | Markham et al. |
| 6,148,771 | A | 11/2000 | Costello |
| 6,634,970 | B2 | 10/2003 | Jiminez |
| D545,509 | S | 6/2007 | Wang |
| 7,600,488 | B2 | 10/2009 | Mann |
| 8,113,150 | B1 | 2/2012 | Tsengas |
| 9,770,010 | B2 | 9/2017 | Wechsler |
| 9,844,703 | B1 * | 12/2017 | Gupta .................. A01K 15/025 |
| D817,562 | S | 5/2018 | Markham |
| 10,285,380 | B1 | 5/2019 | Mullin |
| D886,397 | S | 6/2020 | Baker et al. |
| 11,678,644 | B2 | 6/2023 | Markham |
| 2012/0279459 | A1 | 11/2012 | Angle et al. |
| 2013/0074780 | A1 | 3/2013 | Wechsler |
| 2014/0209038 | A1 | 7/2014 | Simon |
| 2022/0201978 | A1 | 6/2022 | Markham |

OTHER PUBLICATIONS

CNIPA, Notification of the First Office Action in application No. 202180088470.6, Jan. 4, 2024, pp. 16.

EPO, European Search Report for application No. 21916502.4, Mar. 19, 2024, pp. 12.

Japan Patent Office, Notice of Reasons for Rejection in application No. 2023-540690, Jan. 29, 2024, pp. 10.

UKIPO, Combined Search and Examination Report under Sections 17 and 18(3) for Application No. GB2400127.3, Feb. 26, 2024, pp. 8.

GoughNuts Pro 50 Ball-Dog Toy, 3-in, 3 pages, online available at https://www.chewy.com/goughnuts-ball-dog-toy-3-in/dp/221411?utm_source=google-product&utm_medium=cpc&utm_campaign=hg&utm_content=GoughNuts&utm_term=&gclid=Cj0KCQjwz4z3BRCgARISAES_OVdVpzlJJ7BTdKczYb8e9VpeuqglHbrVJtNfuVLt6W3Y8ZYleWxpKmcaAoy_EALw_wcB, Known as early as Jun. 22, 2021.

GoughNuts, Interactive ball, 3 pages, online available at https://www.goughnuts.com/balls-2, Known as early as Jun. 22, 2021.

GoughNuts Pro 50 Ball Dog Toy, 3-in, 3 pages, online available at https://www.chewy.com/goughnuts-pro-50-ball-dog-toy-3-in/dp/221413, Known as early as Jun. 22, 2021.

Final Office Action received for U.S. Appl. No. 17/138,590, dated Feb. 24, 2023, 29 pages.

International Preliminary Report on Patentability received for PCT Application Serial No. PCT/US2021/65697 dated Jul. 13, 2023, 10 pages.

International Search Report and Written Opinion received for PCT Application Serial No. PCT/US2021/65697 dated Mar. 7, 2022, 13 pages.

Non-Final Office Action received for U.S. Appl. No. 17/138,590, dated Jun. 20, 2022, 37 pages.

Notice of Allowance received for U.S. Appl. No. 17/138,590, dated May 3, 2023, 33 pages.

goughnuts.com, "goughnuts.com", 2007, p. 6, Publisher: Non-patent literature disclosed in an Information Disclosure Statement in U.S. Appl. No. 29/586,034 on Jan. 18, 2017.

CNIPA, Notification of Second Office Action issued in CN Application No. 202180088470.6, May 9, 2024, 15 pages.

Cole, Douglas, Response to Examination Report issued in GB Application No. 2400127.3, Jul. 22, 2024, 4 pages.

Response to Office Action issued in CN Application No. 202180088470.6, Jul. 30, 2024, 12 pages.

UKIPO, Examination Report issued in GB Application No. 2400127.3, May 21, 2024, 4 pages.

UKIPO, Search Report under Section 17(5) issued in Application No. GB2400292.5, Dec. 3, 2024, 5 pages.

Nguyen, Trinh T, Office Action issued in U.S. Appl. No. 18/668,495, Jan. 6, 2025, 23 pages.

Bare Bones ltd, 2020, GoughNuts Interactive Tough Ball Toy Collection [online] available from: https://www.barebonesltd.co.uk/goughnutsinteractive-black-ball-toy---tough-ball, accessed on February.

* cited by examiner

PET TOY WITH INTERCONNECTING GROOVES AND OPEN CORE

PRIORITY

This application is a continuation-in-part of U.S. patent application Ser. No. 18/142,959 filed on May 3, 2023 which claims priority to, and is a continuation of, U.S. patent application Ser. No. 17/138,590, filed Dec. 30, 2020, which are incorporated by reference herein in its entirety.

FIELD OF THE INVENTION

The invention relates to a pet toy especially designed to function as a ball for throw and retrieve, and more particularly, to a dog toy having interconnecting and continuous grooves to prevent blockage of airflow while a dog holds the pet toy in its mouth regardless of the depth of the toy in the dog's mouth and throat.

BACKGROUND OF THE INVENTION

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker", is also known to be placed inside the toy to further stimulate the animal.

Another general category of pet toys are those which may generally be referred to as "plush" toys. These types of toys are made from different types of cloth or fabric, and may also include material woven into strands, such as nylon rope. The plush toy is typically stuffed with a fibrous material, such as polyester stuffing, to provide the toy with an increased thickness or bulk that enables the animal to chew on the toy. Plush toys may also include squeakers to further stimulate the animal.

One particularly popular dog toy is a simple ball toy that can be used for fetch and retrieve play. There are many flexible and elastomeric balls manufactured as dog toys. Balls are easy to throw by an owner and the rolling action of a ball enables it to travel adequate distances when thrown. The curved, spherical shape of a ball is easy for dog to hold within its mouth.

While balls continue to be one of the most common types of dog toys, there are also problems associated with use of balls as dog toys. Likely the most problematic feature of balls as dog toys is that balls can become stuck in the throat of the dog. Balls have unfortunately been linked with dog deaths by asphyxiation. If the diameter of a ball is close to the diameter of the throat opening in a dog, the ball can become lodged in the throat of the dog under many circumstances. One circumstance is when a dog catches the ball in midair and the force of the ball causes it to lodge in the throat opening of the animal. Another circumstance is the inadvertent lodging of the ball in the throat as an owner may attempt to remove the ball from the dog's mouth; the act of moving the hand against the ball can in some circumstances cause the ball to be pushed down further into the animal's mouth and into the throat opening.

Other problems associated with hollow balls is that a dog may be able to easily chew through the material of the ball and ingest pieces of the ball. Tennis balls have long been used as dog toys and are most widely used, but unfortunately, many tennis balls are not of sufficient quality and therefore, the dog can easily chew through the tennis ball material.

A problem can also be associated with flexible, hollow balls in that the flexing or deformation of the ball may allow the ball to penetrate deeper into the dogs throat, therefore presenting a choking hazard.

Any circumstance associated with lodging of a ball in the throat of a dog can result in a tragic and unfortunate event, one that can be avoided with proper sizing of a ball and selection of the type of ball being used. Unfortunately, proper sizing of a ball for a particular dog is not made apparent in the sale and promotion of balls as dog toys. Oftentimes, a manufacturer may only provide a single size ball which is ultimately sold to dog owners of many different size breeds.

Considering the foregoing disadvantages of the use of traditional balls as dog toys, there is a need to provide a dog toy which has the same characteristics as a ball for use in play such as fetch and retrieve play but overcomes the potential dangers of a ball presenting a choking hazard. Further, there is a need to provide a pet toy which can be used by dog breeds of many sizes, but still maintains adequate safety to prevent choking.

One commercially available pet toy which functions as a ball but further includes a plurality of interconnected channels is the Goughnuts® interactive ball dog toy. This dog toy as its peripheral surface segmented into eight distinct quadrants or sections with grooves that separate the sections. The walls of the grooves are parallel to one another and a cross-sectional view of the grooves provide a distinct U-shape. The grooves each have a wide and uniform cross-sectional U-shape.

One patent reference that discloses a pet toy similar in shape to the Goughnuts® interactive ball dog toy, but with noticeable modifications, is the U.S. Design Pat. No. 817,562. This reference more particularly discloses a dog toy with a peripheral surface also segmented into eight distinct quadrants or sections, but the grooves are significantly wider and shallower. The walls of the grooves also present a U-shape when viewed in cross-section, but the U shape is noticeably wider and shallower.

While the Goughnuts® interactive ball dog toy and the U.S. Design Pat. No. 817,562 may be adequate for their intended purposes, further improvements are required in order for dog toys of these general designs to be able to adequately prevent choking. In connection with the invention described herein, specific features of the invention are described in detail which ensure that the dog toy can be used safely with many different sized breeds, yet the dog toy of the present invention can still serve as a functional ball for use in play such as fetch and retrieve.

Accordingly, the specific attributes and features of the invention described herein should be understood by one skilled in the art to sufficiently distinguish over the known prior art.

SUMMARY OF THE INVENTION

The pet toy in one embodiment comprises a spherical shaped body with eight distinct quadrants or sections formed on the exterior surface thereof. Each section is three sided, similar to an equilateral triangle except each corner of the triangular-shaped section is curved or rounded. A central opening is formed through the pet toy. There may be a single central opening, or the opening may extend through both opposite sides of the pet toy. The pet toy comprises a hollow core and may have a substantially uniform sidewall thickness and/or a sidewall thickness that changes across varying cross-sections of the toy The particular material for the pet toy may be selected from a group of moldable, elastomeric rubber compounds and preferably, puncture resistant rubber compounds that will withstand the biting action of an animal.

A plurality of grooves or channels are defined between each quadrant or section. The walls of the grooves present a substantially V-shaped configuration in which the grooves progressively narrow as the grooves extend towards the center of the pet toy. The bottom of the grooves may have a very slight gap thus separating facing walls, but to the observable eye, this slight gap is nearly imperceptible thus maintaining a distinct visual V-shaped configuration.

Another way in which to describe each corner of the triangular shaped sections is that each of the corners have distinct curved chamfers that cause the walls of the grooves to maintain their distinct V-shaped appearance in cross-section.

At the six locations on the outer surface of the toy where the edges of four sections meet, a diamond-shaped area is found that is a function of the presentation of the deepest edges of the adjacent groove walls.

As discussed in further detail below, the particular sizing and spacing of the grooves, as well as the V-shaped orientation of the grooves maximizes the ability of the toy to maintain an airway when the toy is held within the animal's mouth and more particularly, if the toy becomes lodged deeper in the mouth into the throat of the animal. The substantially spherical shape of the toy without protruding edges enables the pet toy to still roll like a ball and to be thrown like a ball. Further, the central opening provides an additional means for maintaining an airway when the ball is held in a dog's mouth.

According to another preferred embodiment of the invention, the pet toy may include a strand of rope or other fibrous material that is placed through the central opening. The rope may include one or more knots. Use of the rope may enhance play with the dog in which the rope can be used to play tug, or to enhance throwing action for the owner. Alternatively, the rope may also provide a dog a different type of texture for chewing.

Considering the foregoing features of the invention in various preferred embodiments, in one general aspect, the invention may be considered a pet toy comprising: a body having an exterior surface and a sidewall; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about $1/16$th to $1/4$th inch and an angle subtended by the V-shape is between about 30° to 60°.

According to another general aspect of the invention, it may be considered a pet toy comprising: a body having an exterior surface and a sidewall; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about $1/16$th to $1/4$th inch, a diameter of the pet toy is at least 2.5 inches, a width of said grooves as measured near said exterior surface is between about $3/8$ to $1/2$ inch.

According to yet another general aspect of the invention, it may be considered a pet toy comprising: a body having an exterior surface and a sidewall having a substantially uniform thickness; a central opening formed through the exterior surface; a hollow core forming an interior of said body; a plurality of sections extending outward from said exterior surface and defined by grooves that bound each said quadrant, each of said sections having a triangular shape; each of said grooves having a V-shape when viewed in cross-section; and wherein a depth of said grooves is between about $1/16$th to $1/4$th inch, a diameter of the pet toy is at least 2.5 inches, a width of said grooves as measured near said exterior surface is between about $3/8$ to $1/2$ inch.

In one embodiment, a pet toy includes a spherical body having an outer surface and inner hollow core, a central opening extending through opposite sides of the spherical body, and channels extending at least partially around a circumference of the spherical body. The channels collectively form a plurality of raised sections of the outer surface, the raised sections each having a triangular shape with rounded vertices. A shape of the rounded vertices, a shape of the channels, and depth of the channels collectively form respiratory passages around the spherical body that prevent sealing between the spherical body and a throat of an animal.

In a further embodiment, the channels comprise grooves each having V-shaped sidewalls and a depth between $3/16$ to $1/2$ inch. In another further embodiment, the rounded vertices of the raised sections, the V-shaped sidewalls of the grooves, and the depth of the grooves collectively form the respiratory passages on the spherical body that prevent the sealing between the spherical body and the throat of an animal. In yet another further embodiment, each of the grooves have rounded edges configured to deflect chewing forces and prevent teeth of the animal from damaging the grooves. In still a further embodiment, the V-shaped sidewalls are configured to engage with teeth of the animal to prevent the pet toy from sliding toward the throat as the animal catches the pet toy. In another further embodiment, an angle subtended by the V-shape is between about 30° to 60°, and a width of the grooves as measured between top edges of the V-shaped sidewalls is between about $3/8$ to $1/2$ inch. In a further embodiment, the respiratory passages enable sufficient airflow for animal respiration through a contacting area between the spherical body and the throat regardless of orientation of the spherical body. In another further embodiment, the inner hollow core comprises a substantially spherical core. In yet another further embodiment, a diameter of the pet toy is between 2.5 to 4.0 inches.

Another embodiment is a pet toy that includes a spherical body having an outer surface and inner hollow core, a central opening extending through opposite sides of the spherical body, and respiratory passages extending at least partially around a circumference of the spherical body, wherein the respiratory passages are sized to enable sufficient airflow for animal respiration through a contacting area between the spherical body and a throat of an animal regardless of orientation of the spherical body.

In a further embodiment, the respiratory passages collectively form a plurality of raised sections on the outer surface of the spherical body, the raised sections each having a triangular shape. In another further embodiment, the respiratory passages prevent sealing between the spherical body and the throat of an animal. In yet another further embodiment, the respiratory passages have V-shaped sidewalls and a depth between 3/16 to 1/2 inch. In still yet another further embodiment, the V-shaped sidewalls have rounded edges, a width of the V-shaped sidewalls as measured between the rounded edges of the V-shaped sidewalls is between about 3/8 to 1/2 inch, and the V-shaped sidewalls are configured to engage with teeth of the animal to prevent choking as the animal catches the pet toy.

Yet another embodiment is a pet toy that includes a spherical body having an outer surface and inner hollow core, and V-shaped grooves extending at least partially around a circumference of the spherical body. The V-shaped grooves collectively form a plurality of raised sections on the outer surface of the spherical body. The V-shaped grooves are sized and shaped to securely engage with teeth of an animal to prevent sliding movement of the pet toy within a mouth of the animal.

In a further embodiment, the raised sections each have a triangular shape with rounded vertices, the rounded vertices configured to prevent sealing between the throat of an animal and the spherical body, and the V-shaped grooves have rounded edges configured to deflect the teeth of an animal. In another further embodiment, the rounded vertices of the raised sections, the rounded edges of the V-shaped grooves, and a size and shape of the V-shaped grooves collectively form respiratory passages on the spherical body that prevent the sealing between the spherical body and a throat of an animal. In yet another further embodiment, the V-shaped grooves have a depth between 3/16 to 1/2 inch, and a width of the V-shaped grooves as measured between the rounded edges is between 3/8 to 1/2 inch. In still yet another further embodiment, the V-shaped channels are sized and shaped for sufficient airflow for animal respiration through a contacting area between the spherical body and a throat of an animal regardless of orientation of the spherical body. In another further embodiment, the pet toy further includes a central opening extending through opposite sides of the spherical body.

Additional features and advantages of the invention will become apparent in connection with the detailed description and the drawings which follow.

DETAILED DESCRIPTION OF THE INVENTION

Referring to each of the figures, the pet toy of the invention 10 is a spherical shaped body with a plurality of quadrants or sections 12 that form the exterior surface of the toy. A central opening 14 is formed through opposite sides of the body. The pet toy may also have a substantially uniform thickness or may have varying thickness along cross-sections of the toy.

In some embodiments, a total of eight quadrants or sections 12 make up the outer surface of the toy. Each of the sections 12 may have the same shape and size. The shape of each section 12 may be substantially triangular with curved or rounded edges 22 located where two side edges of a section 12 converge, sometimes referred to herein as a vertex or vertices. These curved or rounded edges 22 may also be described as chamfered or tapered edges or a rounded vertex or rounded vertices.

Figure 1:
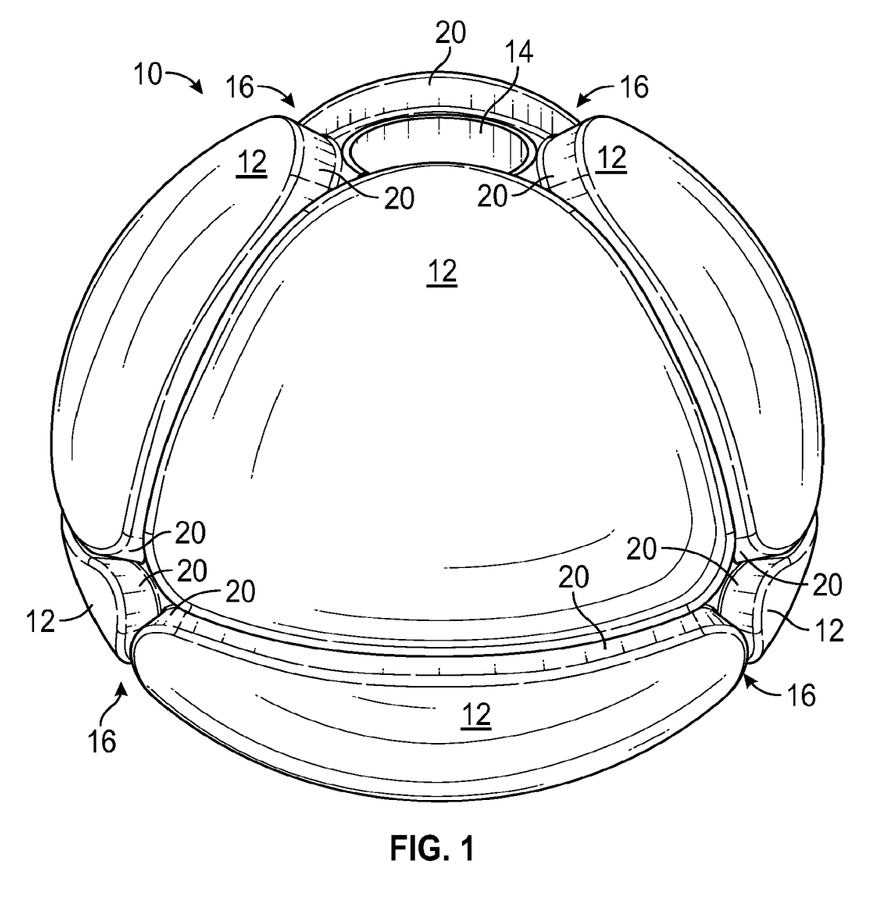
FIG. 1 is a top perspective view of the pet toy of the invention.
Figure 2:
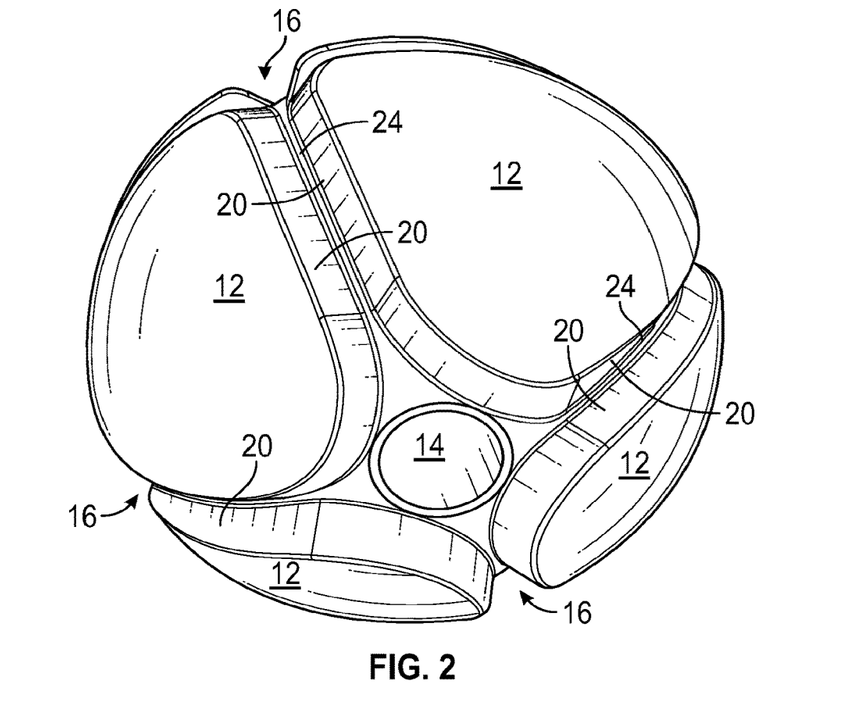
FIG. 2 is a bottom perspective view of the pet toy of the invention.
Figure 3:
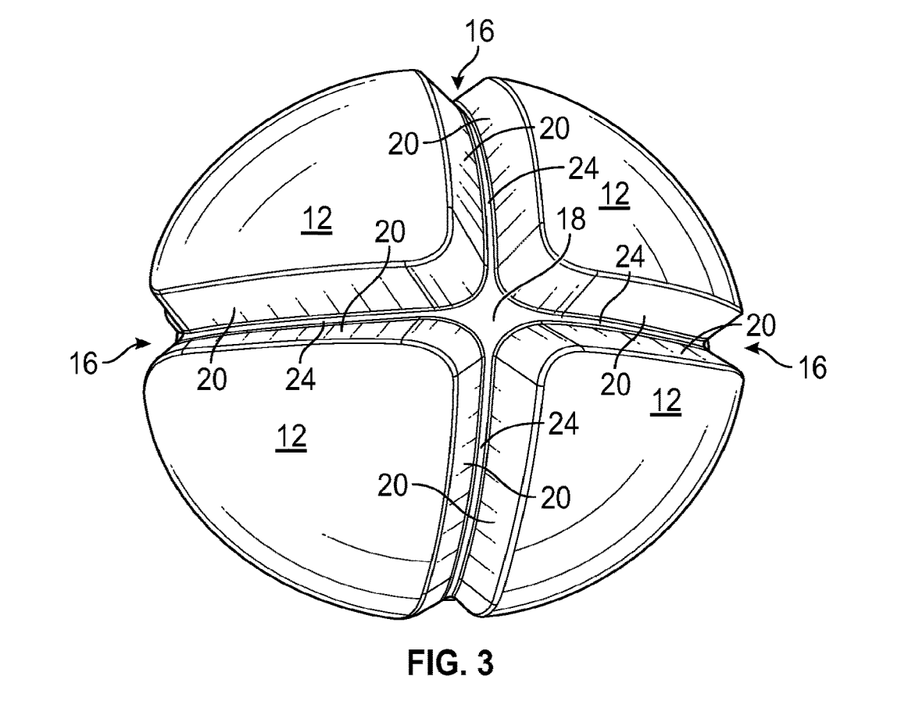
FIG. 3 is a side perspective view of the pet toy of the invention.
Figure 4:
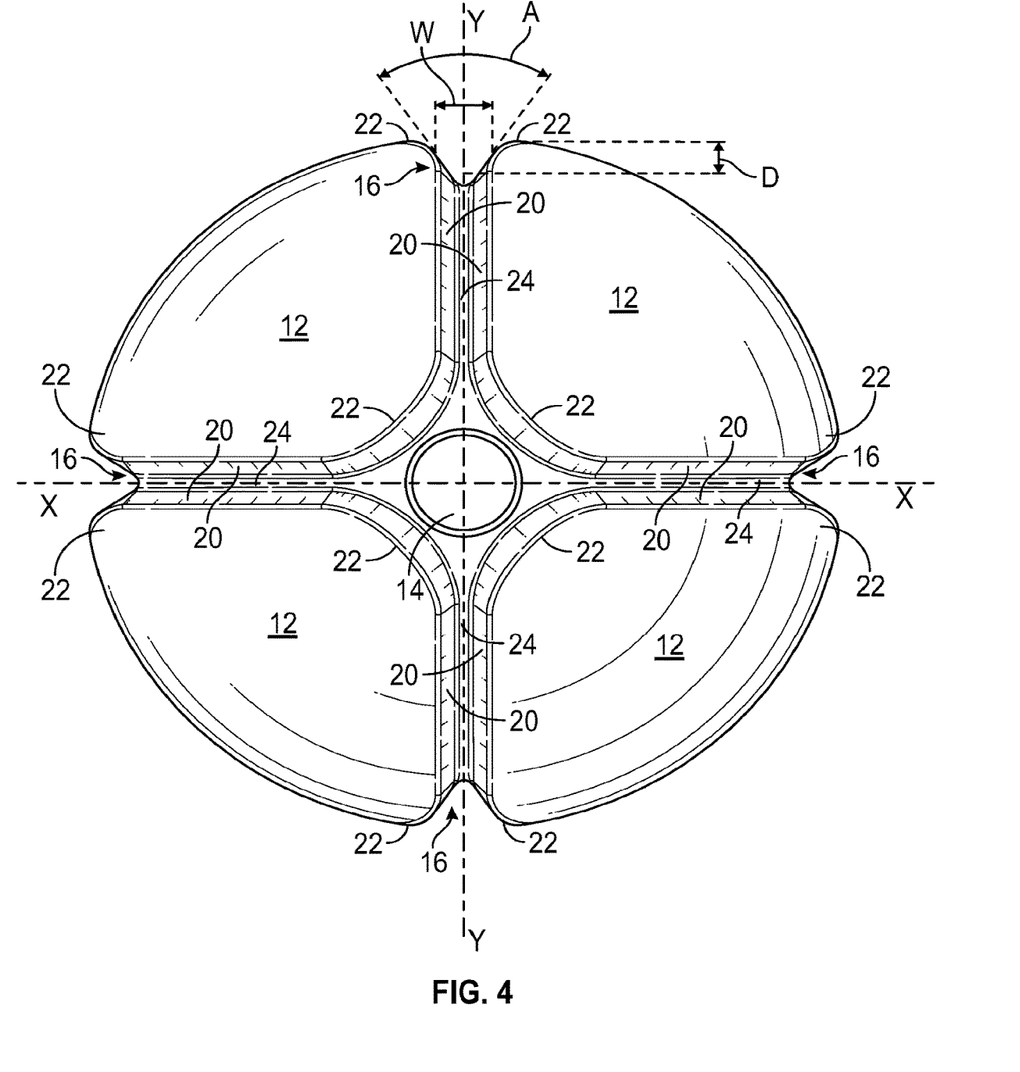
FIG. 4 is an enlarged top elevation view of the pet toy of the invention.
Figure 5:
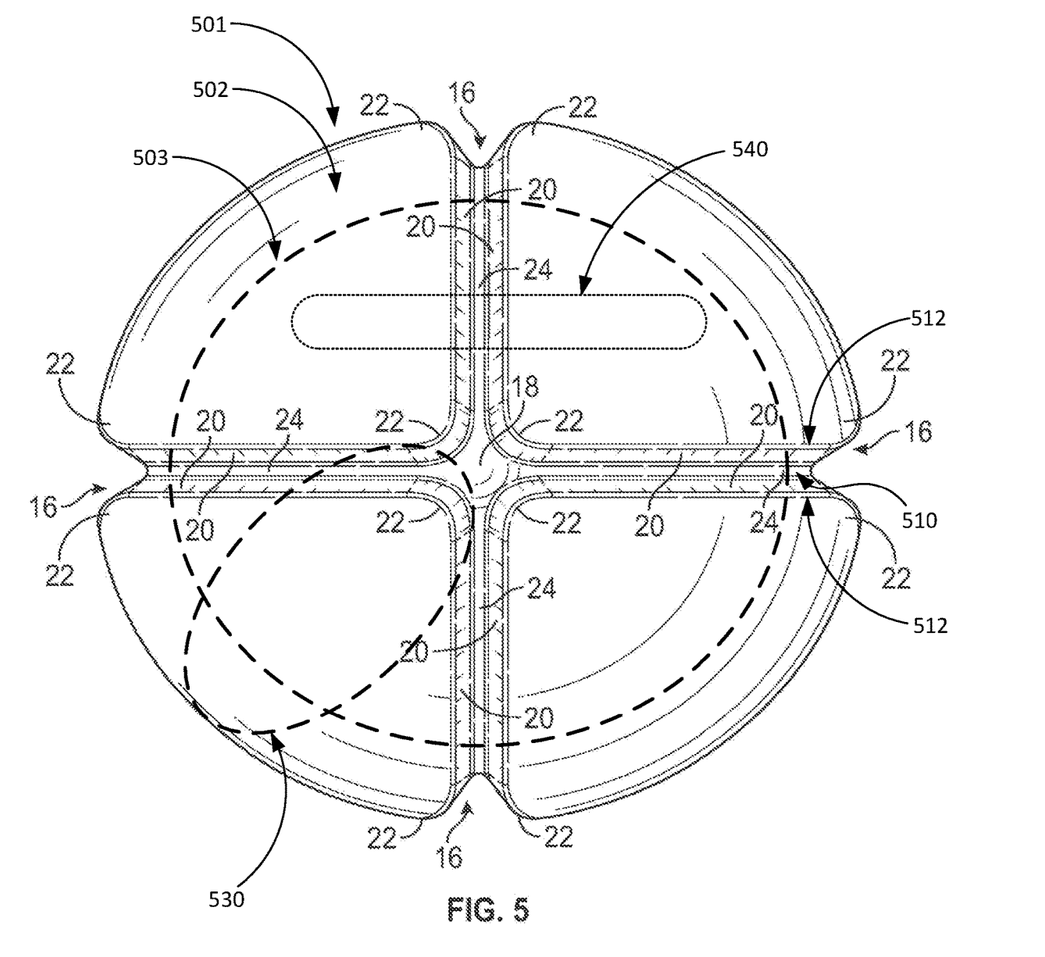
FIG. 5 is an enlarged side elevation view of the pet toy of the invention.
Figure 6:
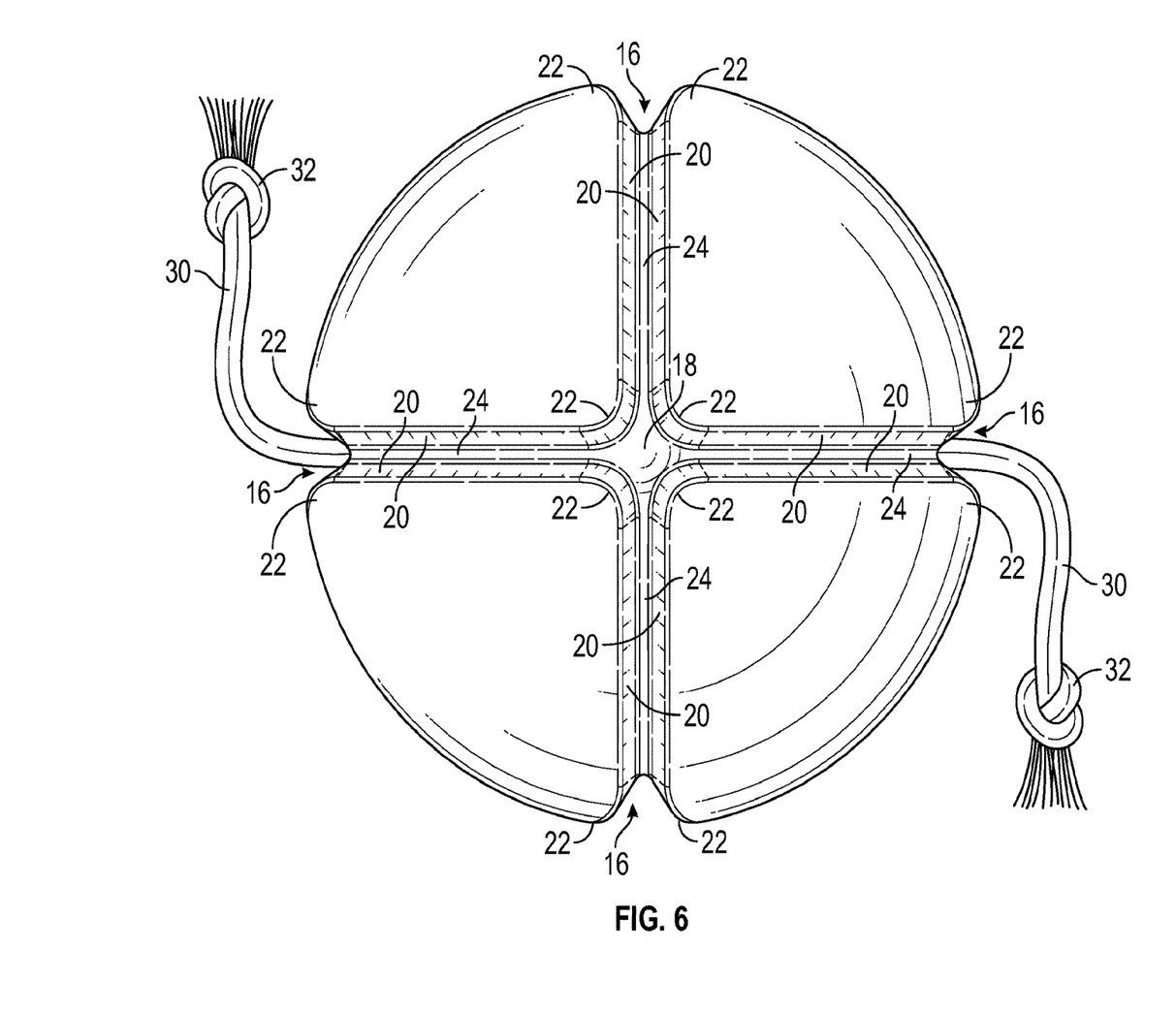
FIG. 6 is an enlarged side elevation view of the pet toy in another embodiment of the invention that includes a strand of fibrous material such as a rope.

Grooves 16 are formed between each of the sections 12. A groove is defined by opposing groove walls 20 that are angled with respect to one another thus forming a distinctive V-shape. The bottom of each groove 24 is defined by a very slight gap 24 between opposing groove walls 20; however, when reviewing a groove such as shown in FIGS. 4-6, the corresponding gap 24 is nearly imperceptible and thus each of the grooves maintain the distinctive V-shape. In some embodiments, the gap 24 corresponds with a short distance of a floor or bottom surface between opposing groove walls 20. Alternatively, in some embodiments, the gap 24 corresponds with a space in which there is an absence of material between opposing walls 20, thus exposing the inner core of the pet toy through the gap 24. In such embodiments, connecting material at other areas (e.g., an inner/central core of the spherical body) may hold the sections 12 together and form the structure of the pet toy.

The grooves 16 advantageously provide several pet safety features. In one embodiment, a shape, depth, and/or width of the grooves 16 are configured to prevent sealing between the spherical body and a throat of an animal or dog. In one aspect, the grooves 16 may comprise respiratory passages around the spherical body that enable sufficient airflow for animal respiration. That is, in an instance in which the spherical body lodges adjacent to or within the throat, the size and shape of the grooves 16 provide airway space between the toy and the mouth/throat for sufficient exchange of oxygen and carbon dioxide for safe respiratory function of the dog. In some embodiments, the respiratory passages are formed by a combination of pet toy features described herein including one or more features of the grooves 16, one or more features of the sections 12 such as the rounded vertices or intersection areas 18, and/or one or more other features of the outer surface of the pet toy such as the central opening 14.

In some embodiments, there are six locations on the outer surface of the toy where the edges of four sections 12 meet, and at each of these locations a diamond-shaped area 18 is present that is a function of the visual presentation of the deepest edges of the adjacent groove walls at that location. In other embodiments, there are ten locations at the outer surface of the toy where the edges of sections 12 meet, or in which grooves, channels, and/or airways intersect. In one embodiment, a star-shaped area may be formed at the locations.

Measured characteristics of the toy, including the depth, width and shape of the grooves 16, are critically important, alone and in combination with one another. Consider the ball as a valve: the throat of a dog is the seat for the valve. One object of the invention is to prevent asphyxiation by preventing the valve from seating or sealing, i.e., cutting off the airway of the dog. Also, throat tissue is semi-soft and wet which makes it easier to seal. During testing of the invention, experiments were conducted with a cylindrical shaped glass of water and prototypes of the invention having varying groove depths. The prototypes were placed to cover the top of the glass. The water glass was tipped upside down to determine the minimum groove depth required to generate an appreciable amount of water flow. The water flow simulated the passage of air through a dog's throat. The testing indicated that 1/16 of an inch was the minimum depth for any appreciable amount of water to flow, thus establishing a minimum amount of air flow through the grooves. The testing further indicated that 1/8 to 1/4 inch was optimal to permit flow of the fluid through the grooves. The tapered or rounded intersection areas between the sections 12 reduce the sealing capability as compared to a groove having only straight groove side edges. Grooves that are too deep reduce structural integrity and therefore, while deeper grooves might permit better airflow, the structural integrity of the toy is degraded to an extent in which a dog can too easily chew off sections of a quadrant around a groove edge. The tapered or rounded groove edges function to deflect a dog's teeth therefore reducing a dog's ability to chew and rip the edges. Even with shallower grooves that have defined sharp edges, i.e., groove edges that are squared-off and have an angle of approximately a 90°, these shallower grooves can be too easily chewed and removed as well.

Grooves that are too wide cause an erratic bounce and it is desirable to maintain the pet toy as a functional ball that uniformly bounces and rolls to optimize play potential.

As compared to a ball with no grooves, the outer surface of the invention with the quadrants and grooves results in a dog being able to reliably grasp and hold the ball in the dog's teeth. There is a high chance that the dog's teeth will penetrate at least one of the grooves during the catching action and therefore, additional frictional resistance results to prevent the ball from penetrating too deep into the dog's throat. A wet round ball certainly raises the risk that the dog will not be able to stop the momentum of the ball in its teeth.

Referring specifically to FIG. 4, according to preferred embodiments of the invention, dimension measurements are provided for the pet toy which enable it to prevent choking and asphyxiation of an animal such as a dog. Preferably, the diameter of the pet toy is at least about 2.5 inches which prevents the pet toy from becoming lodged in a dog's throat. A larger diameter is also contemplated within embodiments of the invention; accordingly, the 2.5-inch diameter can be considered a minimum diameter to prevent asphyxiation for most dogs.

In some embodiments, the depth D of the grooves is between about 1/8th to 1/4th inch and a minimum depth of at least about 1/16th inch, as mentioned. In one embodiment, the depth D of the grooves is between about 3/16 to 1/2 inch. A width of the groove W measured near the exterior surface of the pet toy is preferably between about 3/8 to 1/2 inch. The angle A subtended by the V-shaped groove is preferably between about 30° to 60°. The diameter of the central opening 14 may be between about 1/2 to 5/8 inch. As mentioned, the central opening 14 provides an additional path for air to flow when the toy is in a dog's mouth. In some embodiments, the central opening 14 extends through opposite sides of the toy. For instance, the central opening 14 as shown in FIG. 4 may extend in a direction into the page such that a hollow cylindrical path extends through the spherical body with two circular rims (e.g., central opening(s) 14) at opposing sides of its exterior surface. As shown in FIG. 5, a spherical body 501 of the pet toy may include an outer surface 502 and an inner hollow core 503 (shown by the dashed outline). The inner hollow core 503 may comprise the hollow cylindrical area described above and/or a substantially spherical shape or core as shown in FIG. 5.

FIG. 5 also shows an embodiment with V-Shaped grooves 510 or channels having rounded edges 512 along the top edge of its walls. When a dog chews on the toy, the rounded edges 512 provide a technical benefit in that they are configured to deflect or redirect the teeth away from the edge to significantly reduce damage to the edges that may otherwise occur (e.g., if such edges were sufficiently sharp or sufficiently close to a right angle) from the biting or chewing force of the dog. Additionally, the rounded edges 512 are configured to prevent sealing between the toy and the mouth or throat of the dog. Moreover, when a dog is catching the toy, the V-shaped walls of the V-shaped grooves 510 have a size and shape configured to securely catch the ball and prevent choking. That is, as compared to a U-shaped groove in which the teeth of a dog can slide or move freely, the V-shaped grooves 510 are configured to engage the teeth by allowing the teeth to drop, but not slide, within the V-shaped grooves 510, so that the toy is securely caught in the mouth and prevented from sliding backward and lodging at or near the throat.

Additionally, FIG. 5 illustrates a contacting area 530 which is a representative area of contact between the spherical body 501 and the inner mouth or throat of an animal or dog. In general, the grooves and/or respiratory passages of the spherical body 501 are arranged such that the contacting area 530 at any location of the spherical body 501 overlaps sufficiently with one or more respiratory passages so that the dog is able to safely breathe. In other words, the respiratory passages have a size and location that enable sufficient airflow for dog respiration through the contacting area 530 regardless of orientation of the spherical body 501 and/or specific location of the contacting area 530. As used herein, respiratory passages may include grooves, channels, intersection areas, and/or the central opening described above. In some embodiments, the term channels may be used interchangeably with grooves 16. In other embodiments, channels may be similar to grooves 16 but include a spaced gap between opposing walls such that the hollow core is exposed through the channel gap.

In one embodiment, the pet toy or spherical body 501 includes one or more extra air grooves 540 to further enhance or ensure the pet safety features described herein. The extra air grooves 540 may include any or all of the features of the grooves 16 described herein. In some embodiments, the extra air grooves 540 extend only partially around the circumference of the spherical body 501 as opposed to grooves 16 which may extend around the circumference of the spherical body 501. Alternatively or additionally, an extra air groove 540 may traverse or cross a groove 16 or channel in a perpendicular direction.

Another important measured parameter is the weight of the toy. A toy that is too heavy will become lodged deeper in the animal's throat if the animal catches the ball on the fly. A toy that is too light will not provide adequate play because the owner will not be able to throw the toy a sufficient distance. Additionally, a toy that is too light is typically an indicator that the toy is not made of a sufficiently resilient and elastomeric material and therefore, the toy can be more easily destroyed by chewing. Optimally, the pet toy should be made of a resilient and elastomeric rubber compound which provides sufficient strength for a long-lasting pet toy as well as providing sufficient weight.

In one embodiment, the pet toy 10 comprises a ball that has a diameter of between about 2.5 to 4.0 inches and a weight between about 8 and 11 ounces. In another embodiment, the pet toy 10 has a diameter of approximately 3.5 inches and a weight of approximately 9.5 ounces.

Considering the foregoing measured parameters and other characteristics of the invention, it should be understood that the invention does not require each measured parameter to be present. Rather, some improved functionality is achieved with the invention by having parameters provided together in various sub-combinations. Therefore, it should be further understood that the scope of the invention herein is not limited to a pet toy that must have all the measured parameters and one may select any sub-combinations for improved toy performance and to prevent asphyxiation of an animal such as a dog.

FIG. 6 illustrates another embodiment in which the pet toy 10 further includes a rope or strand of flexible material or rope 30 with knotted ends 32. The rope 30 is routed through the openings 14 on both opposite ends of the toy. The length of the rope in one preferred embodiment may be between about 12 to 16 inches.

The rope 30 can be used to further enhance play by tug-of-war with a dog or to enhance a throwing action by the pet owner. Another option is to have the rope 30 only extend through one of the openings 14 in which one end of the rope (not shown) remains in the core of the pet toy as by an enlarged knotted end or an end that is otherwise enlarged so it cannot pass through the opening. The other end can be knotted as shown in this figure. Longer lengths of rope are also contemplated which can be adopted for specific purposes, such as enhanced tug-of-war in which greater lengths of the rope can be more easily grasped by the owner and dog.

By use of the rope 30, this provides additional functionality to prevent asphyxiation of an animal because the rope enlarges the overall diameter of the toy and the rope can be pulled by an owner to release the toy if the toy becomes lodged too deep in the dog's throat. The rope also provides additional play opportunities by tug-of-war action in which the owner can grasp one end of the rope and the dog holds the other end of the rope in the teeth. The rope also enhances throwing of the toy.

According to yet another embodiment, the diameter of the toy can be less than 2.5 inches if the rope is added. The rope provides additional safety so the toy cannot remain lodged in a dog's throat since the owner can pull the rope to dislodge the toy.

While the invention has been described herein with respect to various preferred embodiments, the invention is not limited to such preferred embodiments and the scope of the invention shall therefore be interpreted commensurate with the claims appended hereto.

What is claimed is:

1. A pet toy comprising:
a spherical body having an outer surface and inner hollow core;
a central opening extending through opposite sides of the spherical body; and
channels extending at least partially around a circumference of the spherical body, wherein the channels collectively form a plurality of raised sections of the outer surface, the raised sections each having a triangular shape with rounded vertices;
wherein a shape of the rounded vertices, a shape of the channels, and depth of the channels collectively form respiratory passages around the spherical body that prevent sealing between the spherical body and a throat of an animal; wherein the channels comprise grooves each having V-shaped sidewalls and a depth between 3/16 to 1/2 inch; wherein an angle subtended by the V-shape is between about 30° to 60°; and a width of the grooves as measured between top edges of the V-shaped sidewalls is between about 3/8 to 1/2 inch.

2. The pet toy of claim 1, wherein:
the rounded vertices of the raised sections, the V-shaped sidewalls of the grooves, and the depth of the grooves collectively form the respiratory passages on the spherical body that prevent the sealing between the spherical body and the throat of an animal.

3. The pet toy of claim 1, wherein:
each of the grooves have rounded edges configured to deflect chewing forces and prevent teeth of the animal from damaging the grooves.

4. The pet toy of claim 1, wherein:
the V-shaped sidewalls are configured to engage with teeth of the animal to prevent the pet toy from sliding toward the throat as the animal catches the pet toy.

5. The pet toy of claim 1, wherein:
the respiratory passages enable sufficient airflow for animal respiration through a contacting area between the spherical body and the throat regardless of orientation of the spherical body.

6. The pet toy of claim 1, wherein:
the inner hollow core comprises a substantially spherical core.

7. The pet toy of claim 1, wherein:
a diameter of the pet toy is between 2.5 to 4.0 inches.

8. A pet toy comprising:
a spherical body having an outer surface and inner hollow core;
a central opening extending through opposite sides of the spherical body; and
respiratory passages extending at least partially around a circumference of the spherical body, wherein the respiratory passages are sized to enable sufficient airflow for animal respiration through a contacting area between the spherical body and a throat of an animal regardless of orientation of the spherical body; wherein the respiratory passages have V-shaped sidewalls and a depth between 3/16 to 1/2 inch; wherein the V-shaped sidewalls have rounded edges; a width of the V-shaped sidewalls as measured between the rounded edges of the V-shaped sidewalls is between about 3/8 to 1/2 inch; and the V-shaped sidewalls are configured to engage with teeth of the animal to prevent choking as the animal catches the pet toy.

9. The pet toy of claim 8, wherein:
the respiratory passages collectively form a plurality of raised sections on the outer surface of the spherical body, the raised sections each having a triangular shape.

10. The pet toy of claim 8, wherein:
the respiratory passages prevent sealing between the spherical body and the throat of an animal.

11. A pet toy comprising:
a spherical body having an outer surface and inner hollow core; and
V-shaped grooves extending at least partially around a circumference of the spherical body, wherein the V-shaped grooves collectively form a plurality of raised sections on the outer surface of the spherical body, and wherein the V-shaped grooves are sized and shaped to securely engage with teeth of an animal to prevent sliding movement of the pet toy within a mouth of the animal; wherein the raised sections each have a triangular shape with rounded vertices, the rounded vertices configured to prevent sealing between the throat of an animal and the spherical body; the V-shaped grooves have rounded edges configured to deflect the teeth of an animal; wherein the V-shaped grooves have a depth between 3/16 to 1/2 inch; and a width of the V-shaped grooves as measured between the rounded edges is between 3/8 to 1/2 inch.

12. The pet toy of claim 11, wherein:
the rounded vertices of the raised sections, the rounded edges of the V-shaped grooves, and a size and shape of the V-shaped grooves collectively form respiratory passages on the spherical body that prevent the sealing between the spherical body and a throat of an animal.

13. The pet toy of claim 11, wherein:
the V-shaped channels are sized and shaped for sufficient airflow for animal respiration through a contacting area between the spherical body and a throat of an animal regardless of orientation of the spherical body.

14. The pet toy of claim 11, further comprising:
a central opening extending through opposite sides of the spherical body.

\* \* \* \* \*